Figure 1:
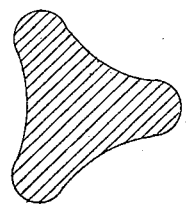
Figure 2:
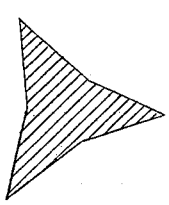

(No Model.)

I. A. TIMMIS.
VEHICLE SPRING.

No. 291,814. Patented Jan. 8, 1884.

Witnesses
Jos. B. Connolly
A. A. Connolly

Illius Augustus Timmis
Inventor
by Connolly Bros
Attys

United States Patent Office.

ILLIUS AUGUSTUS TIMMIS, OF LONDON, COUNTY OF MIDDLESEX, ENGLAND.

VEHICLE-SPRING.

SPECIFICATION forming part of Letters Patent No. 291,814, dated January 8, 1884.

Application filed November 6, 1883. (No model.) Patented in England March 1, 1879, No. 831.

*To all whom it may concern:*

Be it known that I, ILLIUS AUGUSTUS TIMMIS, a subject of the Queen of Great Britain, residing at London, in the county of Middlesex, England, have invented certain new and useful Improvements in Springs for Railway and other Vehicles; and I do hereby declare the following to be a full, clear, and exact description of the invention, such as will enable others skilled in the art to which it appertains to make and use the same.

This invention has relation to springs for railway and other vehicles, and especially to bearing-springs.

The object of this invention is to provide a straight bar-spring—that is, a bar-spring which is distinguished from curved, elliptic, or convoluted springs by having its normal axis on a straight line, or practically so, and which, by reason of its peculiarities, shall possess a maximum of elasticity, resiliency, and strength, with a minimum of working camber, and which is therefore adapted to railway and other vehicles where it is desirable to avoid rocking or jarring under great weight, or under stress of high speed, to which these vehicles are subjected.

My invention, being primarily intended as a substitute for laminated springs, has for its further object a construction whereby the friction and consequent wear and tear imposed on the sliding plates of laminated springs is avoided.

It is well known that the camber of laminated springs is a frequent source of the jarring and rocking of railway and other heavy vehicles traveling at a high rate of speed when, by reason of an uneven road or going around short curves, a vehicle is thrown on the springs on one side, and the load is thus taken temporarily off the springs on the other side, the relieved springs having a tendency to regain their normal camber. As laminated springs frequently have a camber of six or even eight inches, it is obvious that the tendency of a spring to regain its normal camber will produce a corresponding tilt of the car, and thus impair or destroy that evenness of carriage which is desirable.

My invention consists in constructing a straight bar-spring with longitudinal grooves or corrugations for a twofold purpose—namely, to produce great strength in a bar of small cross-section, and consequently great resiliency, (because when the bar is deflected the grooves or corrugations add to its strength by reason of the fact that an arch cannot be turned on itself,) and for the reason that if there are grooves in a bar it can be made of unequal cross-section, and thus an unequal temper can be given to the metal, this unequal temper being of great value as increasing its strength and lasting power.

Figure 6:
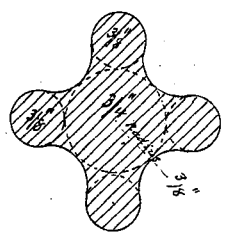
Figure 7:
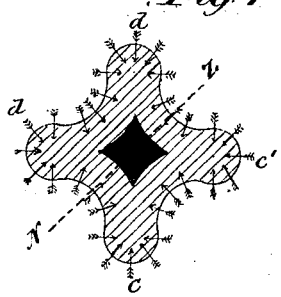
Figure 5:
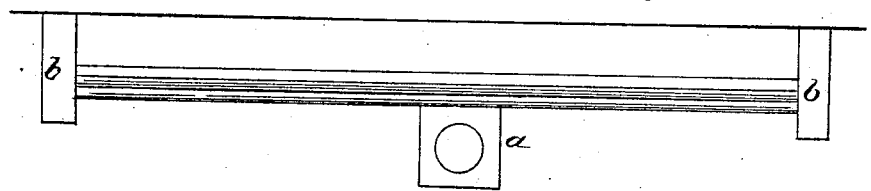
Figure 8:
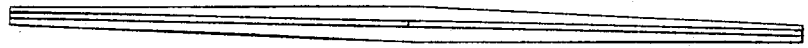

For the purposes of my invention I make bars of steel of any unequal cross-section, as shown in Figures 1, 2, 3, and 4 of the drawings, and with any number of grooves or corrugations, which grooves and their corresponding projections may be of any shape or form. Fig. 5 is a side elevation of the spring applied to a vehicle. Figs. 6 and 7 are cross-sections of the bar. Fig. 8 is plan of the spring, and Fig. 9 a view of one end thereof.

Figure 3:
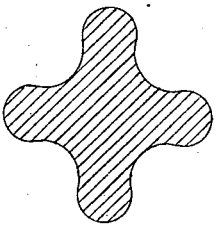
Figure 4:
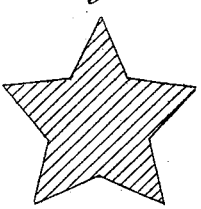

A steel bar—say of the form shown in Fig. 3 of the drawings—constitutes an entire spring, and may be utilized for bearing purposes by putting the center of the bar on the center of the axle-box $a$, as shown in Fig. 5, and supporting the vehicle on the ends of the bar by means of the standards $b$. These standards or brackets may be made of any convenient shape, and may be rigid or arranged to swing from the under frame of the vehicle.

While the bar, as described, is well adapted to perform its proper functions, I prefer to reduce the cross-section dimensions toward the ends in any suitable degree or ratio, instead of leaving it of the same thickness and shape from end to end. For example, referring to Fig. 6 of the drawings, supposing the diameter of the large dotted circle is three-fourths of an inch and the radius is three-eighths of an inch, the diameter of the four thin webs is three-eighths of an inch, and the radii $c$ of the outside grooves three-eighths of an inch. Then I reduce the dimensions of all the parts, so that they are, say, one-half at the ends of the bar—that is, the diameter of the center is three-eighths of an inch, the diameter of their webs or projections three-sixteenths of an inch, and the radii of the grooves three-sixteenths.

Figure 9:
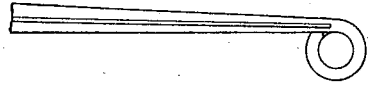

The advantages of the reductions of dimensions from the center to the ends are as follows: First, the strength is not diminished;

second, the weight is considerably lessened. third, the temper of the bar is perfectly regulated thus. After the bar is rolled or hardened, the temper is drawn so that their webs or projections are thoroughly tempered or softened. This tempering process projects from the outside inward, as shown in Fig. 7 by the arrows; but as the time allowed for the tempering the outside projections only allows the thick part to be partially or case tempered, it is evident that the center of the thick part, (see the blackened center of Fig. 7,) remains hard and of immense strength. Now, by reducing the dimensions of the bar from the center to the ends—say by one-half or more—this softening or tempering process extends farther and farther inward to the center in proportion as the size of the bar is reduced. In other words, the size of the hard part of the bar is reduced from the center till at the ends there is no hard part at all, and thus the ends are protected against fracture. It is evident that the projections (see Fig. 7) are more perfectly tempered or softened than any other part, and protect the thick part of the bar from fracture. When the bar is made, it may be fitted with plain ends, or it may have eyes, as shown in Fig. 9, at either end. The eyes should be oval or elongated, to allow for play. The line N Z, Fig. 7, is the neutral zone, if that form of bar is used, and if the points $d\ d'$ are in tension the points $c\ c'$ are in compression.

It will be noted that it is advisable to have the least amount of metal at the neutral zone. Of course any suitable camber can be given to the bars, according to their strength, length, and load they have to carry; but a bar four feet long to carry a working load of twenty-five hundred-weight, I have found to work well with a camber of one and five-sixteenths inch.

I prefer to fit two bars side by side to work together, either bar being strong enough in ultimate power to sustain the load; but of course any suitable number can be fitted.

Having described my invention, I claim—

1. A spring for railway and other vehicles, consisting of a bar of metal of unequal cross-section, grooved in the direction of its length and reduced in diameter from the center toward the ends, said spring having its normal axis straight, substantially as and for the purpose set forth.

2. A spring for railway and other vehicles, consisting of a bar of metal of unequal cross-section, and grooved in the direction of its length, said spring having a straight axis, substantially as described.

ILLIUS AUGUSTUS TIMMIS.

Witnesses:
A. A. CONNOLLY,
JOS. B. CONNOLLY.